(12) United States Patent
Watkins

(10) Patent No.: US 12,210,679 B1
(45) Date of Patent: Jan. 28, 2025

(54) ATTENTION REDIRECTION WITHIN AR/XR IMMERSIVE ENVIRONMENTS

(71) Applicant: Rockwell Collins, Inc., Cedar Rapids, IA (US)

(72) Inventor: David Watkins, Layton, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/406,945

(22) Filed: Jan. 8, 2024

(51) Int. Cl.
*G09G 5/00* (2006.01)
*G02B 27/01* (2006.01)
*G06F 3/01* (2006.01)
*G06V 10/46* (2022.01)
*G09B 9/30* (2006.01)

(52) U.S. Cl.
CPC ........... *G06F 3/013* (2013.01); *G02B 27/017* (2013.01); *G06V 10/462* (2022.01); *G09B 9/307* (2013.01)

(58) Field of Classification Search
CPC .... G06F 3/013; G02B 27/017; G06V 10/462; G09B 9/307
USPC ..................................... 345/8, 156, 173, 174
See application file for complete search history.

(56) References Cited

U.S. PATENT DOCUMENTS

| | | | |
|---|---|---|---|
| 9,213,405 B2 | 12/2015 | Perez et al. | |
| 9,292,973 B2 | 3/2016 | Bar-Zeev et al. | |
| 9,323,325 B2 | 4/2016 | Perez et al. | |
| 9,690,099 B2 | 6/2017 | Bar-Zeev et al. | |
| 11,276,126 B2 | 3/2022 | Bastide et al. | |
| 11,568,604 B2 | 1/2023 | Stafford et al. | |
| 2018/0275394 A1 | 9/2018 | Yeoh et al. | |
| 2019/0179418 A1* | 6/2019 | Marggraff | G06F 3/04842 |
| 2020/0074724 A1 | 3/2020 | Mathur et al. | |
| 2020/0097754 A1* | 3/2020 | Tawari | G06V 10/82 |
| 2020/0305708 A1* | 10/2020 | Krueger | G06F 3/013 |
| 2020/0379214 A1 | 12/2020 | Lee et al. | |
| 2021/0064128 A1* | 3/2021 | Alcaide | G06F 3/04815 |
| 2021/0090323 A1* | 3/2021 | Hazra | G06T 15/20 |
| 2021/0248833 A1* | 8/2021 | Singh | G06T 19/006 |
| 2022/0092331 A1* | 3/2022 | Stoppa | G06V 30/274 |
| 2023/0069764 A1* | 3/2023 | Jonker | G06F 9/451 |
| 2023/0086766 A1 | 3/2023 | Olwal et al. | |

(Continued)

FOREIGN PATENT DOCUMENTS

WO 2023028284 A1 3/2023

OTHER PUBLICATIONS

U.S. Department of Transportation, Federal Aviation Administration, Advisory Circle entitled "Pilots Role in Collision Avoidance", dated Apr. 19, 2016, AC No. 90-48D and Change 1 dated Jun. 28, 2016, AC No. 90-48D.

*Primary Examiner* — Thuy N Pardo
(74) *Attorney, Agent, or Firm* — Suiter Swantz IP

(57) ABSTRACT

A system and method for attention redirection is disclosed. The system may include a display, an environment imaging sensor configured to receive environment images comprising elements of an environment, a user state sensor configured to receive user images comprising a user gaze, and a controller. The controller may be configured to execute program instructions to receive environment images, identify elements and their identities and locations, receive user images comprising the user gaze, track the user gaze direction, determine salience values associated with the elements, and direct a focus adjustment of at least one region of the display based on the salience values.

20 Claims, 5 Drawing Sheets

(56) References Cited

U.S. PATENT DOCUMENTS

| | | | |
|---|---|---|---|
| 2023/0107040 A1* | 4/2023 | Alcaide | G02B 27/0172 345/156 |
| 2023/0333712 A1* | 10/2023 | Burns | G06F 3/017 |

* cited by examiner

ATTENTION REDIRECTION WITHIN AR/XR IMMERSIVE ENVIRONMENTS

TECHNICAL FIELD

The present disclosure relates generally to displays, and, more particularly, to focus redirection of a user viewing a display.

BACKGROUND

Augmented reality (AR) and extended reality (XR) are immersive technologies that allow users to interact with digital content in a physical environment. AR and XR technologies have been used in a variety of applications, such as gaming, education, and industrial training. In these applications, users are presented with a variety of visual data, such as external real-world objects and rendered objects such as 3D models, text, and images.

In some applications, such as remote commercial aircraft piloting, a pilot may be desired to quickly and accurately identify and respond to critical visual data. For example, a pilot may need to quickly identify and respond to an approaching external object such as an aircraft. However, in an immersive AR/XR environment, the pilot may be overwhelmed by the amount of visual data and may not be able to quickly identify and respond to the critical data.

Therefore, there may be a desire for redirecting a user's attention in an immersive AR/XR environment while maintaining the immersive atmosphere.

SUMMARY

A system for attention redirection is disclosed in accordance with one or more illustrative embodiments of the present disclosure. In one illustrative embodiment, the system may include a display and an environment imaging sensor configured to receive environment images comprising elements of an environment. In another illustrative embodiment, the system may include a user state sensor configured to receive user images comprising a user gaze. In another illustrative embodiment, the system may include a controller with one or more processors communicatively coupled to the display, the environment imaging sensor, and the user state sensor. The controller may be configured to execute program instructions to receive environment images, identify elements and their identities and locations, receive user images comprising the user gaze, track the user gaze direction, determine salience values associated with the elements based on the element identities and an element awareness value based on the user gaze direction relative to the element locations, and direct a focus adjustment of at least one region of the display based on the salience values.

In a further aspect, the focus adjustment may include transitioning a focused region of the display to an element location of an element based on a salience value associated with the element. In another aspect, the focus adjustment may include providing a focused region aligned with the user gaze direction, transitioning the focused region to align with an element location over time, maintaining the alignment for a dwell time period, expanding an aperture size of the focused region over time, and removing the defocusing of other areas. In another aspect, the display may include an augmented reality display. In another aspect, the controller may be further configured to receive overlay information, and the salience values associated with the elements may be further based on the overlay information. In another aspect, the overlay information may include vehicle guidance information of a vehicle element, which may comprise altitude and speed. In another aspect, the element assessor module may be configured to generate element risk values corresponding to the elements based on the element identities, and the salience values associated with the elements may be further based on the element risk values. In another aspect, the direction of the focus adjustment may be further based on the salience value breaching a salience threshold. In another aspect, the controller may be further configured to monitor and sort a list of the elements based on the salience values of the elements. In another aspect, the salience values of particular elements may be based on a look-away time period that the user gaze direction is non-proximate to the particular elements.

A method is disclosed in accordance with one or more illustrative embodiments of the present disclosure. In one illustrative embodiment, the method may include receiving environment images via an environment imaging sensor, which include elements of an environment external to a display. In another illustrative embodiment, the method may include identifying elements and their identities and locations associated with at least a portion of the elements. In another illustrative embodiment, the method may include receiving user images via a user state sensor, which include a user gaze. In another illustrative embodiment, the method may include tracking a user gaze direction based on the user images. In another illustrative embodiment, the method may include determining salience values associated with the elements based on the element identities and an element awareness value based on the user gaze direction relative to the element locations. In another illustrative embodiment, the method may direct a focus adjustment of a region of the display based on the salience values.

In a further aspect, the focus adjustment may include transitioning a focused region of the display to an element location of an element based on a salience value associated with the element. In another aspect, the focus adjustment may include providing a focused region aligned with and based on the user gaze direction by directing a defocusing of other areas, transitioning the focused region to align with an element location of an element over time based on a salience value of the element, maintaining the alignment with the element location for a dwell time period, expanding an aperture size of the focused region over time, and removing the defocusing of the other areas. In another aspect, the method may further include expanding the aperture size of the focused region. In another aspect, the display may include an augmented reality display. In another aspect, the method may further include receiving overlay information, where the salience values associated with the elements are further based on the overlay information. In another aspect, the overlay information may include vehicle guidance information of a vehicle element. In another aspect, the vehicle guidance information may include altitude and speed.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
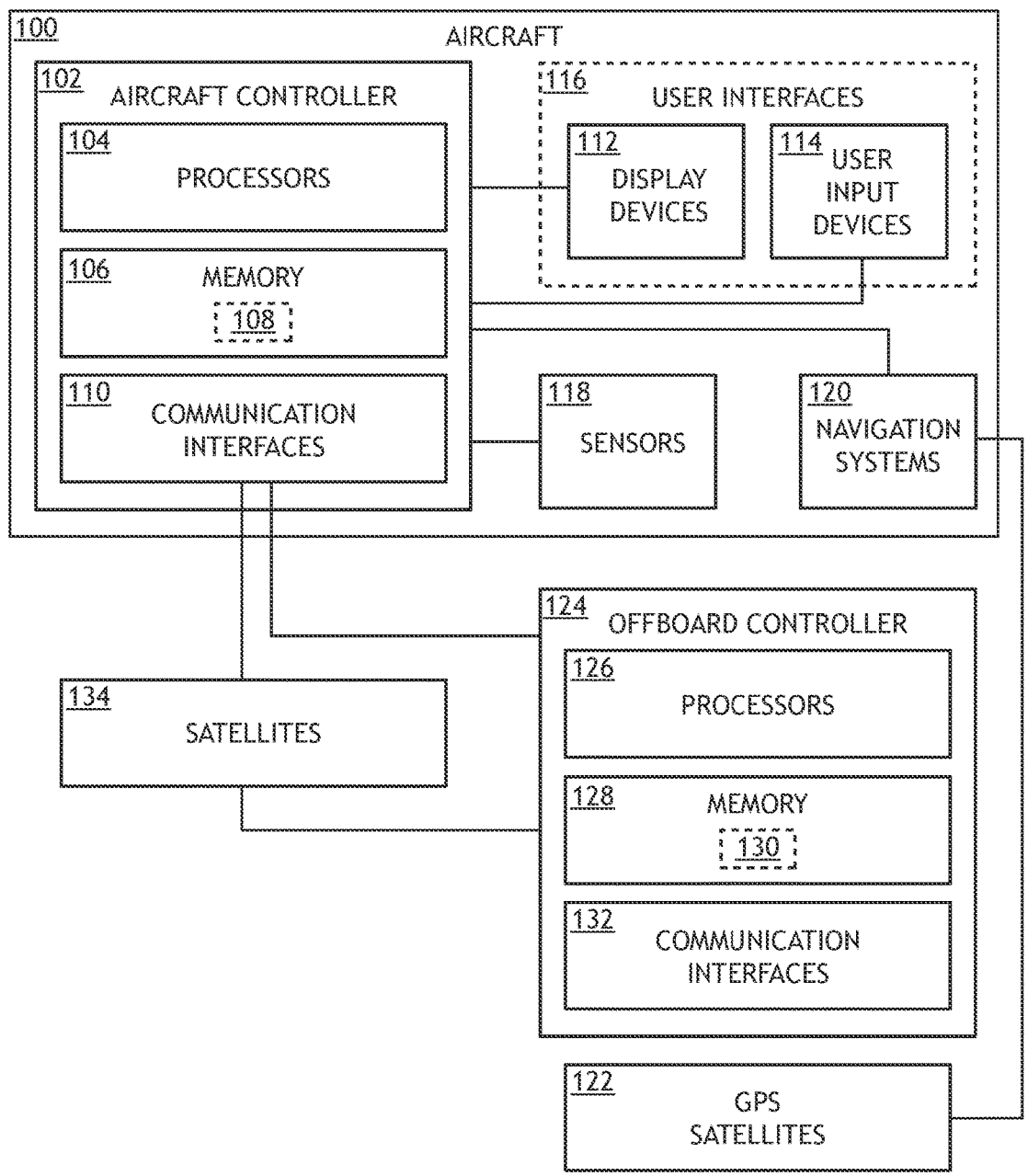
FIG. 1 is a simplified block diagram of an aircraft including the system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

The Federal Aviation Administration (FAA) released an FAA Advisory Circular (AC No: 90-48D with Change 1, dated Jun. 28, 2016) that describes a pilot's responsibilities to see and avoid mid-air collision risks. The Advisory Circular describes examples of risks for mid-air collisions and collision prevention methods used to avoid those risks.

Broadly speaking, at least some embodiments of the concepts disclosed herein are directed to a system and method for monitoring the external real world and augmented overlays (e.g., altitude, distance, speed of nearby aircraft), and then calculating a risk-based salience of the various real-world or displayed (e.g., rendered) elements. In embodiments, the system may calculate a target gaze direction and focus of a user and then defocus the sounding visual areas, closing the aperture towards the target. The target may also be highlighted. Upon user fixation and specified dwell time, the focus aperture may relax and expand. If multiple non-co-located targets are identified, the defocus redirection may be applied to those in order of highest saliency. In this way, by providing dynamic focus control and transitions, the user gaze may be redirected/guided to objects of salience/importance in a gentle matter to enable greater situational awareness and safety.

The guiding/directing of focused regions may be a way of directing attention that is less overwhelming or mentally fatiguing than other methods (e.g., rendering bright text alerts near the element).

In embodiments, the time a user is looking away from an object may be used to determine a lack of focus and awareness on that object, which may be used to determine when to direct the user's attention towards the object. This may allow refreshing of stale situational awareness.

In embodiments, moving the focus area dynamically around a view of a user may be used for training a user, such as for dynamic scan patterns within immersive environments.

Embodiments may be used in a variety of applications. For example, embodiments may be used in aircraft cockpits, (remote) drone operations and pilots, Air Traffic Controllers on the ground, and/or the like.

FIG. 1 illustrates an aircraft 100 including a system 138 for attention redirection, in accordance with one or more embodiments of the present disclosure.

Referring now to FIG. 1A, the aircraft 100 may include an aircraft controller 102 (e.g., on-board/run-time controller). The aircraft controller 102 may include one or more processors 104, memory 106 configured to store one or more program instructions 108, and/or one or more communication interfaces 110.

The aircraft 100 may include an avionics environment such as, but not limited to, a cockpit. The aircraft controller 102 may be coupled (e.g., physically, electrically, and/or communicatively) to one or more display devices 112. The one or more display devices 112 may be configured to display three-dimensional images and/or two-dimensional images. For example, the display devices 112 may include (and/or be) an augmented reality display 112, such as being configured to view real-world objects (passthrough) and rendered objects simultaneously. For example, the display devices 112 may include (and/or be) a mixed reality display 112.

The avionics environment (e.g., the cockpit) may include any number of display devices 112 (e.g., one, two, three, or more displays) such as, but not limited to, one or more head-down displays (HDDs) 112, one or more head-up displays (HUDs) 112, one or more multi-function displays (MFDs) 112, one or more adaptive flight displays (AFDs) 112, one or more primary flight displays (PFDs) 112, or the like. The one or more display devices 112 may be employed to present flight data including, but not limited to, situational awareness data (e.g., salience values) and/or flight queue data to a pilot or other crew member. For example, the situational awareness data (e.g., salience values) may be based on, but is not limited to, aircraft performance parameters, aircraft performance parameter predictions, sensor readings, alerts, or the like.

The aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, one or more offboard controllers 124, and/or the one or more common user interfaces 116 may be standalone components. It is noted herein, however, that the aircraft controller 102, the one or more offboard controllers 124, and/or the one or more common user interfaces 116 may be integrated within one or more common housings or chassis.

The aircraft controller 102 may be coupled (e.g., physically, electrically, and/or communicatively) to and configured to receive data from one or more aircraft sensors 118. The one or more aircraft sensors 118 may be configured to sense a particular condition(s) external or internal to the aircraft 100 and/or within the aircraft 100. The one or more aircraft sensors 118 may be configured to output data associated with particular sensed condition(s) to one or more components/systems onboard the aircraft 100. Generally, the one or more aircraft sensors 118 may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more navigational systems 120. The one or more navigational systems 120 may be coupled (e.g., physically, electrically, and/or communicatively) to and in communication with one or more GPS satellites 122, which may provide vehicular location data (e.g., aircraft location data) to one or more components/systems of the aircraft 100. For example, the one or more navigational systems 120 may be implemented as a global navigation satellite system (GNSS) device, and the one or more GPS satellites 122 may be implemented as GNSS satellites. The one or more navigational systems 120 may include a GPS receiver and a processor. For example, the one or more navigational systems 120 may receive or calculate location data from a sufficient number (e.g., at least four) of GPS satellites 122 in view of the aircraft 100 such that a GPS solution may be calculated.

It is noted herein the one or more aircraft sensors 118 may operate as a navigation device 120, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors 118 may provide aircraft location data and aircraft orientation data, respectively, to the one or more processors 104, 126.

The aircraft controller 102 of the aircraft 100 may be coupled (e.g., physically, electrically, and/or communicatively) to one or more offboard controllers 124.

The one or more offboard controllers 124 may include one or more processors 126, memory 128 configured to store one or more programs instructions 130 and/or one or more communication interfaces 132.

The aircraft controller 102 and/or the one or more offboard controllers 124 may be coupled (e.g., physically, electrically, and/or communicatively) to one or more satellites 134. For example, the aircraft controller 102 and/or the one or more offboard controllers 124 may be coupled (e.g., physically, electrically, and/or communicatively) to one another via the one or more satellites 134. For instance, at least one component of the aircraft controller 102 may be configured to transmit data to and/or receive data from at least one component of the one or more offboard controllers 124, and vice versa. By way of another example, at least one component of the aircraft controller 102 may be configured to record event logs and may transmit the event logs to at least one component of the one or more offboard controllers 124, and vice versa. By way of another example, at least one component of the aircraft controller 102 may be configured to receive information and/or commands from the at least one component of the one or more offboard controllers 124, either in response to (or independent of) the transmitted event logs, and vice versa.

It is noted herein that the aircraft 100 and the components onboard the aircraft 100, the one or more offboard controllers 124, the one or more GPS satellites 122, and/or the one or more satellites 134 may be considered components of a system 138, for purposes of the present disclosure.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, however, that the one or more processors 104, 126 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, Boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110, 134 may be operatively configured to communicate with one or more components of the aircraft controller 102 and/or the one or more offboard controllers 124. For example, the one or more communication interfaces 110, 134 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 134 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 138). In addition, the aircraft controller 102 and/or the one or more offboard controllers 124 may be configured to send data to external systems via a transmission medium (e.g., network connection).

The one or more display devices 112 may include any display device known in the art. For example, the display device 112 may be referred to as a For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 2:
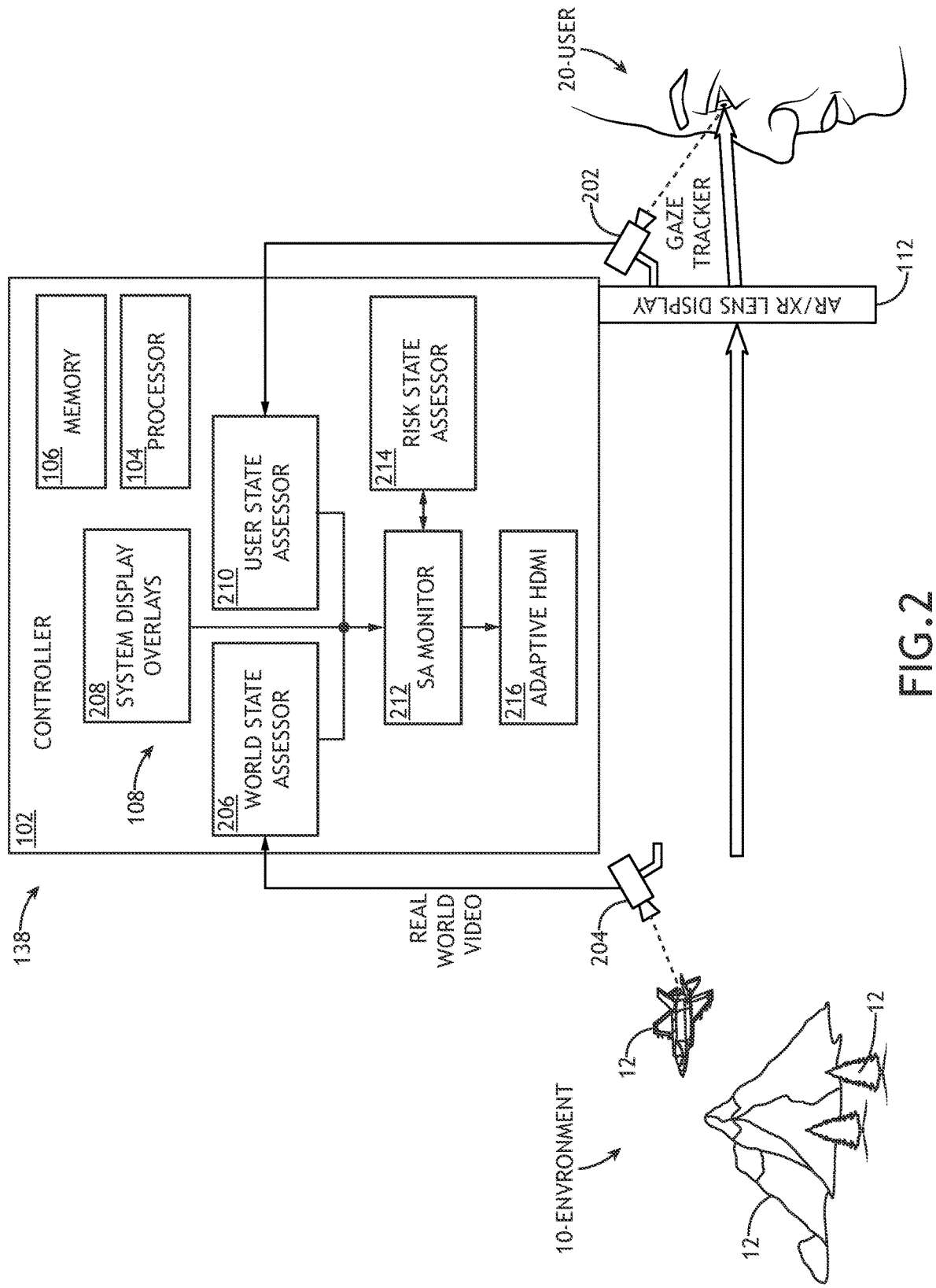
FIG. 2 is a conceptual block diagram of a system including an environment imaging sensor and a user state sensor, in accordance with one or more embodiments of the present disclosure.

FIG. 2 illustrates a conceptual block diagram of a system 138 including an environment imaging sensor 204 and a user state sensor 202, in accordance with one or more embodiments of the present disclosure.

A system 138 for attention redirection may include a display 112, an environment imaging sensor 204, a user state sensor 202, and a controller 102.

The environment imaging sensor 204 may be configured to receive environment images that may include elements 12 of an environment 10. For example, the environment imaging sensor 204 may include one or more multi-pixel cameras and/or other sensors attached on an outer surface of a head mounted display or an aircraft and facing outward towards an external environment 10.

The user state sensor 202 may be configured to receive user images that may include a user gaze of a user 20. For example, the user state sensor 202 may include one or more cameras facing a user's eyes to track a direction of the user's gaze to be used to determine which elements 12 of an environment 10 the user 20 is looking at.

The controller 102 may include one or more processors 104 that may be communicatively coupled to the display 112, the environment imaging sensor 204, and the user state sensor 202. The controller 102 may be configured to execute a set of program instructions stored in a memory 106. These program instructions may be configured to cause the one or more processors 104 to perform several tasks, such as steps of method 400 of FIG. 4.

Tasks, step, and/or the like may be performed by modules (e.g., functions, computer code, neural network models, applications, operating systems, and/or the like stored on a memory 106 of one or more controllers 102).

Figure 4:
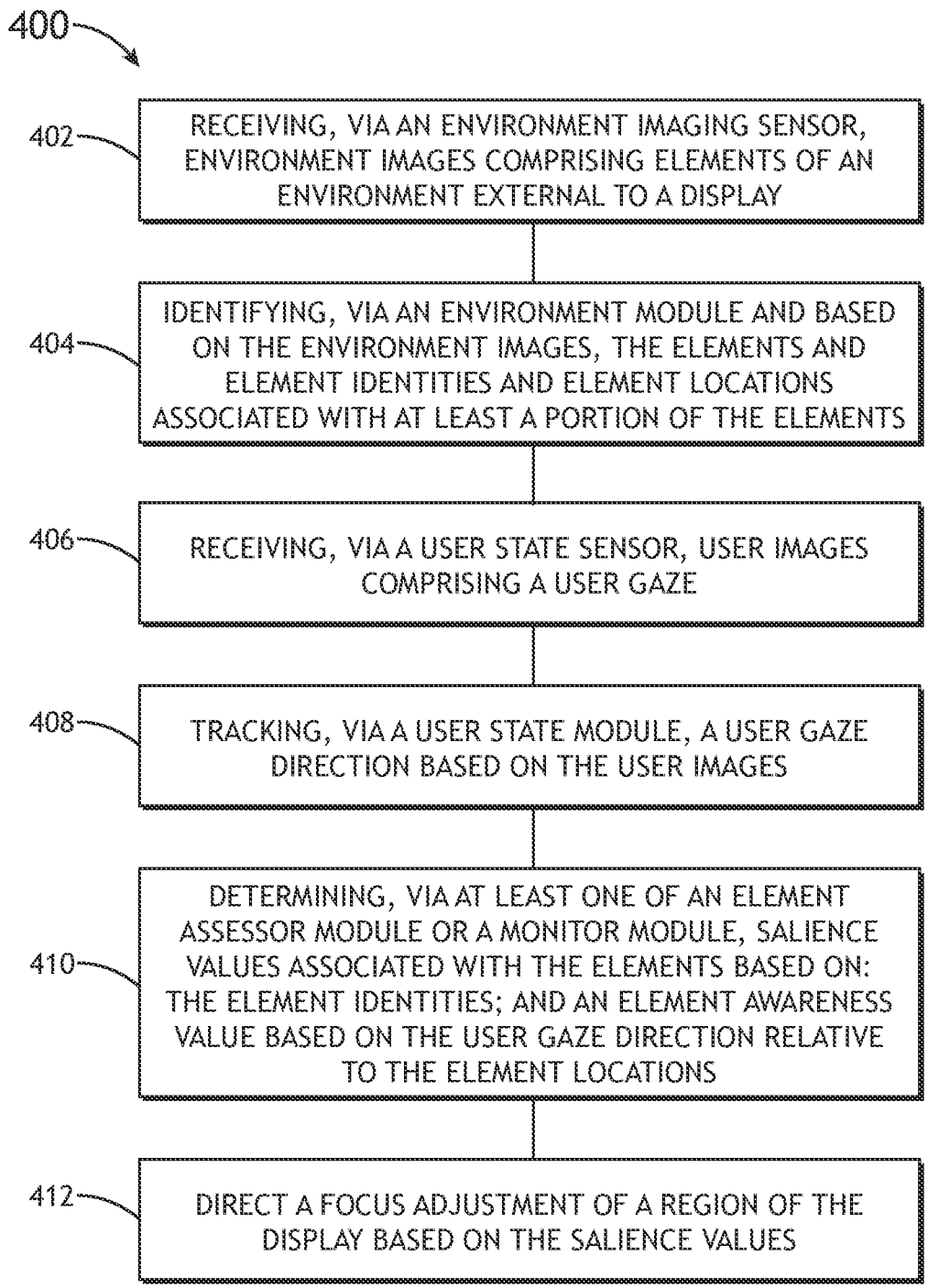
FIG. 4 is a flow diagram illustrating steps performed in a method, in accordance with one or more embodiments of the present disclosure.

FIG. 4 illustrates a flow diagram illustrating steps performed in a method 400, in accordance with one or more embodiments of the present disclosure.

At step 402, environment images comprising elements 12 of an environment 10 external to a display 112 are received. For example, the environment imaging sensor 204 may be used to receive the environment images.

At step 404, the elements 12 and element identities and element locations 302 associated with at least a portion of the elements 12 are identified. For example, each element 12 may be identified using any method in the art and/or disclosed herein. For instance, image segmentation and/or image classification algorithms (e.g., machine learning classifiers) may be applied to the environment images to identify the elements 12 such as other aircraft, trees, objects, and/or the like. Other elements (e.g., rendered elements such as may be superimposed on the display 112 may be known due to being generated). The identified elements 12 may be associated with identities (e.g., image classifications such as "aircraft", "drone", "weapon projectile", and/or the like) and element locations. The element locations may be locations in two-dimensions (e.g., X and Y coordinates) based on the location in the environment image and/or other locations such as locations in three-dimensional space. This can be accomplished via an environment module 206, which may process the environment images to determine these characteristics.

At step 406, user images comprising the user gaze of a user 20 are received, such as through the use of a user state sensor 202. For example, user state sensor 202 may include a camera. For instance, user state sensor 202 may include an infrared sensor configured to image the pupil direction of a user's eye. For example, one user state sensor 202 for each eye may be used. In example, the user state sensor 202 may also include an infrared source (e.g., IR LED) to illuminate the eye of the user 20.

At step 408, a user gaze direction is tracked based on the user images. This tracking may be performed by a user state module 210. The user state module 210 may analyze the user images to ascertain the direction of the user's gaze.

At step 410, salience values associated with the elements 12 are determined. This determination can be made by at least one of an element assessor module 214 or a monitor module 212.

For example, the monitor module 212 may receive risk assessments associated with each element 12 that are determined/calculated by the element assessor module 214. The monitor module 212 may combine the risk assessments, the element identities, and/or element awareness for each element 12. For instance, the system 138 may include an element assessor module 214 that may be configured to generate element risk values corresponding to the elements 12 and which are based on the element identities. The salience values associated with the elements 12 may be further based on the element risk values.

The salience values may be based on the element identities and an element awareness value.

The element awareness value may be based on the user gaze direction relative to the element locations 302. For example, the element assessor module 214 may calculate the salience values by considering the importance or relevance of each element 12 within the environment 10, as well as how the user's gaze direction aligns with the location of these elements. This can involve assessing the potential for interaction or aircraft collision with the elements, their significance within the context of the user's task, or any other factors that may make certain elements more or less salient.

At step 412, a focus adjustment of at least one region 304 of the display is directed based on the salience values. This step may involve the controller 102 manipulating the display 112 to emphasize certain regions corresponding to the elements 12 with higher salience values. An example of regions are regions 304 (e.g., focused regions where other regions outside the focused region 304 are defocused/blurred) of FIGS. 3A and 3B.

Figure 3A:
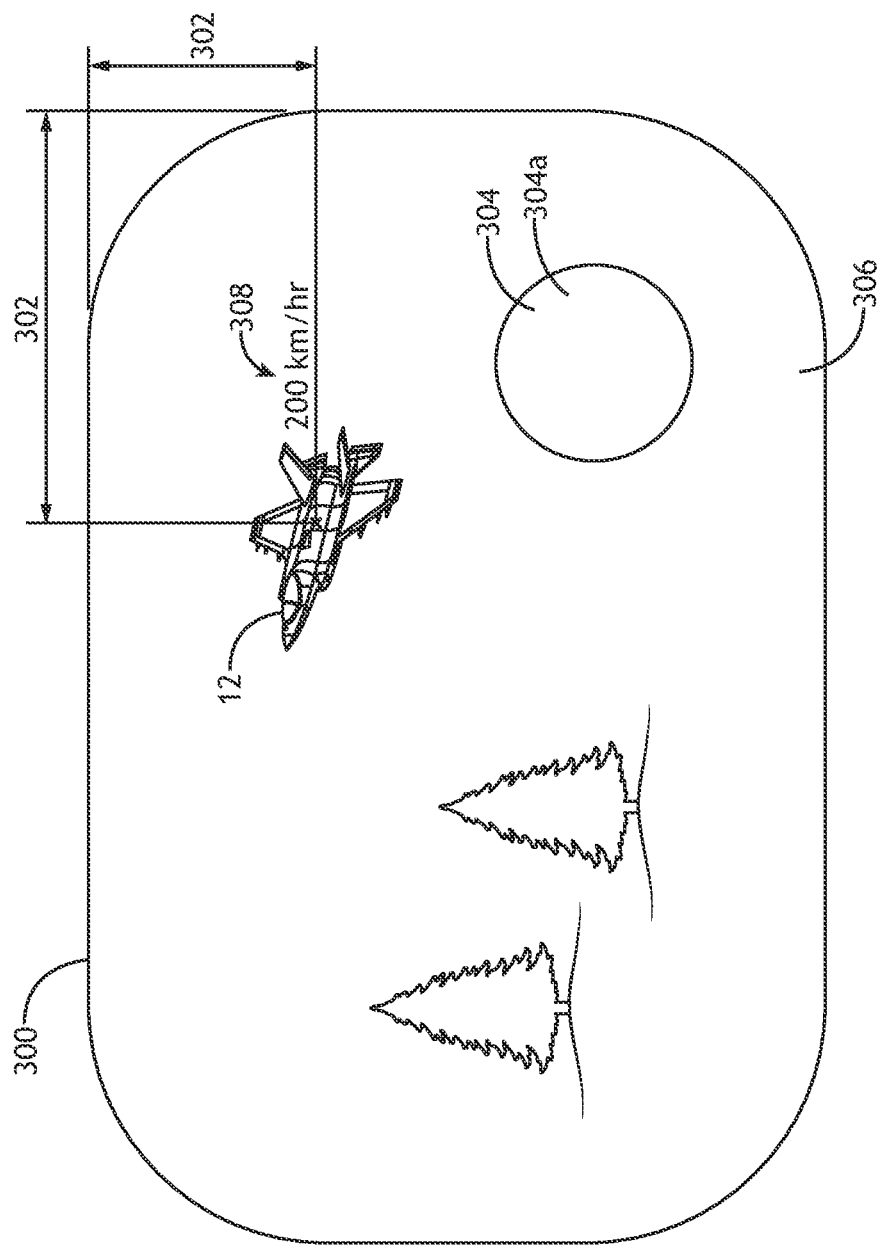
FIG. 3A is a view of a region of a display as aligned with a user's gaze direction, in accordance with one or more embodiments of the present disclosure.
Figure 3B:
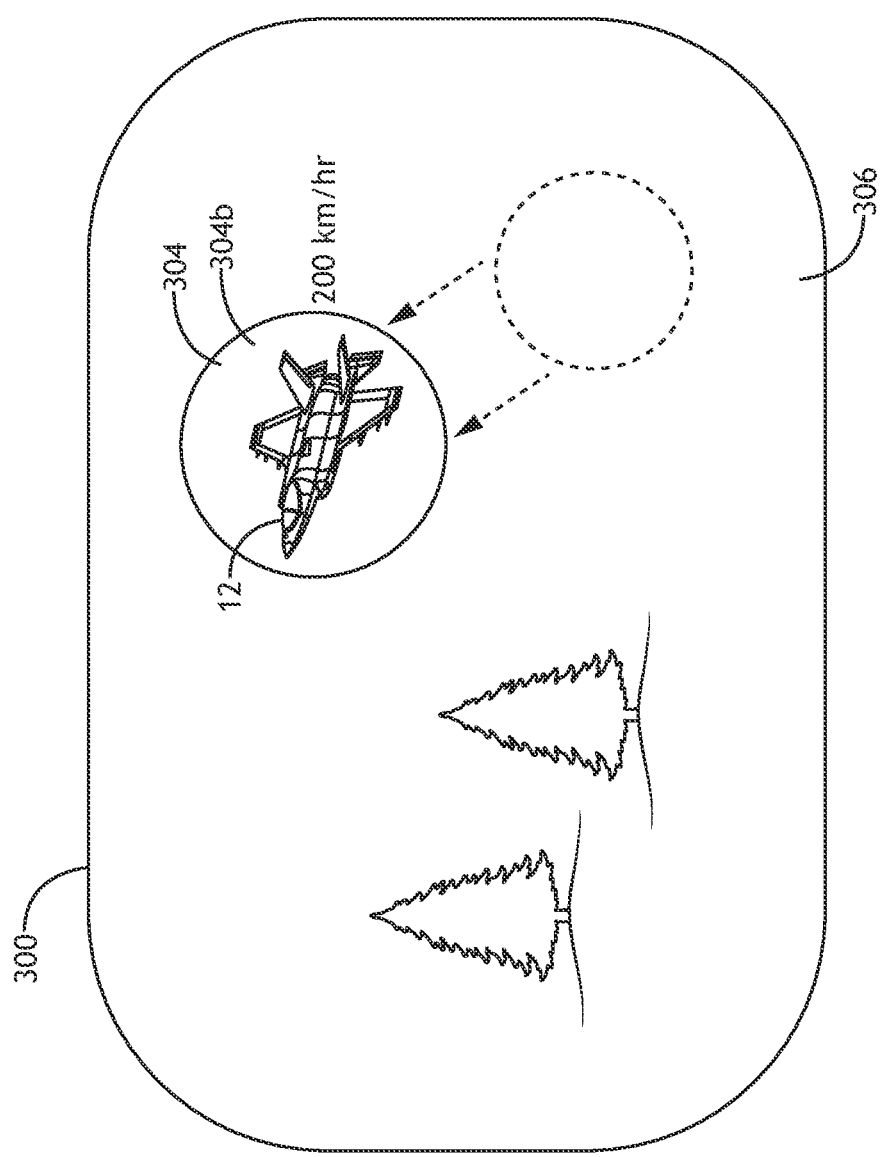
FIG. 3B is a view of a region of a display as aligned with an element location, in accordance with one or more embodiments of the present disclosure.

FIGS. 3A and 3B illustrate transitioning a focused region 304 to guide/direct a user's attention toward an element/object/aircraft over time, in accordance with one or more embodiments of the present disclosure. The guiding/directing of focused regions 304 may be a way of directing attention that is less overwhelming or mentally fatiguing than other methods (e.g., rendering bright text alerts near the element 12).

FIG. 3A illustrates a view 300 (e.g., augmented reality view that a user 20 sees), in accordance with one or more embodiments of the present disclosure. For example, the view 300 may include a region 304 of a display 112 as aligned with a user's gaze direction.

A focus adjustment (e.g., the focus adjustment of step 412) may include transitioning a focused region 304a of the display 112 to an element location of an element 12 based on a salience value. For instance, an aircraft element 12 might not be noticed by a user 20 while the user 20 is looking somewhere else. Transitions/movements of focused regions 304 over time, may allow a gentle guidance of the user's gaze to the aircraft 12.

The focus adjustment may be applied with image processing (e.g., applying blur to other (defocused) areas 306 using image processing/rendering.

The focus adjustment may be applied physically, such as by dynamically adjustable regions of a system 138 (e.g., head mounted AR/XR display) configured to allow selective defocusing/focusing of regions 304/306. For example, multiple actuators may be attached to one or more optical elements (e.g., lenses, apertures, and/or the like) that allow dynamic focusing of the display 112 to desired regions 304. For example, an adaptive optics module 216 may be configured to make such adjustments (e.g., adjusting an actuator coupled to a lens to move a location of a focused region 304 towards an aircraft). For instance, the adaptive optics module 216 may angle, translate, and/or the like an objective lens such that light rays of different regions 304 of a head mounted display are in focus. The adaptive optics module 216 may convert two dimensional coordinates 302 received from a monitor module 212 corresponding a location of an element 12, to a set of optical element adjustments to make to perform a focus adjustment to bring the element 12 into focus by moving a focused region 304.

The focus adjustment may include the following steps, such as in the order listed: providing a focused region 304a aligned with and based on the user gaze direction by directing a defocusing of other areas 306; transitioning the focused region 304a to align with, over time, an element location of an element 12 based on a salience value of the element 12; maintaining the alignment with the element location for a dwell time period (e.g., at least 0.1 seconds and less than 10 seconds); and expanding an aperture size (e.g., diameter of a circular region 304) over time, and then removing the defocusing of the other areas 306. In this way, at the end, all (or more) of the elements 12 are brought into focus after redirecting the user's attention to the salient element. The expansion of the aperture size may not happen immediately (e.g., may be configured to occur over an expansion time). For example, the aperture size may grow until the entire view 300 is in focus. For example, the expansion time may be 0.1 seconds or more. For example, the expansion time may be 0.5 seconds or more.

The controller 102 may be further configured to receive overlay information 308 via an overlay module 208. For example, the overlay information 308 may include vehicle guidance information, such as, but not necessarily limited to speed (e.g., overlayed text reading "200 kilometers/hour"), altitude, relative distance, and/or the like of other elements/aircraft 12. For instance, the display 112 may include overlay information known in the art and/or disclosed herein. For example, such overlay information may be received using methods such as communications for sharing locations on a network and/or radar-based sub-systems for tracking relative positions of nearby aircraft. It is contemplated that embodiments herein may use such information for determining salience of an element for improved redirection of user attention. For example, legacy systems may be networked with and/or replaced using methodologies herein for receiving overlay information. For instance, vehicle guidance information may include altitude and speed, such as corresponding to an aircraft element 12 in view 300.

The salience values associated with the elements 12 may be further based on the overlay information. For example, elements 12 in a path of the user 20 aircraft 100 may be determined high risk, and receive a relatively higher salience value.

Salience values may be on any scale, or any other value indicative of salience. For instance, on a scale of 0.00 to 1.00; a string of "low", "medium", and "high"; and/or the like. Salience values may be scaled in any direction, such as a 0 being a low or a high salience value, depending on the direction of the scale.

The directing/direction of the focus adjustment may be based on the salience value breaching a salience threshold. For example, in a default modality, all areas may be in focus. The focused region 304 (where other regions 306 are defocused) may only be initiated after a salience threshold is breached for at least one element 12. Otherwise, region 304 may not be in use at all.

In some examples, for a scale of salience values of 0 to 1, a breach of a salience value may occur based on a breach above a salience threshold of 0.5 and/or any other value. This may be a value determined using any method, such as selected by a designer/programmer based on any factors, such as determined through trial and error with test pilot runs. The higher the salience threshold, in some embodiments, the less sensitive the system may be.

The controller 102 may be configured to monitor and sort, via the monitor module 212, a list of the elements 12 based on the salience values of the elements 12. For example, the list may sort by highest salience values first. The list may be used to determine which of the elements 12 should have attention directed to it. For example, the system 138 may direct attention to the highest salience value element.

The salience values of particular elements 12 may be configured to be based on a look-away time period that the user gaze direction is non-proximate to the particular elements. For example, if a user is looking at the right half of view 300 for a particular time period (e.g., more than 5 seconds), then the salience values of elements 12 in the left may be adjusted higher.

Note that "higher" salience value and the like is a non-limiting relative term for purposes of clarity, consistency, and conciseness only, and descriptions herein of salience values extend to "lower" values being the most salient as well such as being close to zero or highly negative. The choice of how to indicate and scale salience values and which scale direction or the like to use is merely a relative choice which may have little to no effect practically, all else equal. For instance, "above a threshold value" and/or the like extends to "below a threshold value" and the like for purposes of the present disclosure, depending on the direction of the scale of salience values used.

In embodiments, the salience values may be determined using any method. For example, the salience values may be based on an equation, or combination of equations. For instance, the equation may be based on normalized and equal and/or variably weighted factors, such as element awareness value, element risk value, element identity, and/or the like. For instance, a nonlimiting example of calculating salience value may be weight_1*element_awareness_value+weight_2*element_risk_value, where the element_awareness_value and element_risk_value are values between 0 and 1, and where the weight_1 and weight_2 add up to equal 1.0 such as being both 0.5. Such a calculation will produce a number between 0 and 1. The values of the factors may be based on any method. For example, element_risk_value may be based on a known/stored look up table that matches element identities to values between 0 and 1, such as assigning 0.9 to aircraft, 0.99 to weapon projectiles, and 0.2 to small objects. For instance, the element_awareness_value may be, for illustrative purposes only, assigned a value between 0 to 1 depending on an equation that converts how far away someone is looking and for how long. For instance, element_awareness_value (e.g., element awareness) may be (absolute_value((user gaze_direction−element_location)/maxium_display_distance)+F(look away_time/20))/2, where F(look away_time/20) is a function configured to generate up to a maximum value of 1.0 for 20 seconds and more of looking away. These are merely nonlimiting examples configured to illustrate concepts herein.

FIG. 3B illustrates a view of a region 304 of a display 112 as aligned with an element location 302, in accordance with one or more embodiments of the present disclosure. For example, FIG. 3B may illustrate an element-aligned region 304b, after the transition/moving of the region 304a to the element 12. This may put the element 12 into focus regardless of where the user 20 is looking.

The focus adjustment may take place over time (e.g., non-instantaneously, over a transition-time), such that a focused region 304 moves (e.g., slowly moves) over the view 300 over time. For example, the focus adjustment may occur over multiple frames and over a time period. For instance, the focus adjustment may take at least 0.1 second (e.g., transition time between FIGS. 3A and 3B). For instance, the focus adjustment may take at least 0.5 second. For instance, the focus adjustment may take at least 2.0 seconds. For instance, the focus adjustment may take at least 1.0 seconds. The transition time may allow a user 20 to be guided, and more easily see where the region 304 is moving to.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for attention redirection, the system comprising:
    a display;
    an environment imaging sensor configured to receive environment images comprising elements of an environment;
    a user state sensor configured to receive user images comprising a user gaze of a user; and
    a controller including one or more processors communicatively coupled to the display, the environment imaging sensor, and the user state sensor and configured to execute a set of program instructions stored in a memory, the set of program instructions configured to cause the one or more processors to:
        receive, via the environment imaging sensor, environment images comprising elements of an environment external to a display;
        identify, via an environment module and based on the environment images, the elements and element identities and element locations associated with at least a portion of the elements;
        receive, via the user state sensor, the user images comprising the user gaze;
        track, via a user state module, a user gaze direction based on the user images;
        determine, via at least one of an element assessor module or a monitor module, salience values associated with the elements based on:
            the element identities; and
            an element awareness value based on the user gaze direction relative to the element locations; and
        direct a focus adjustment of at least one region of the display based on the salience values.

2. The system of claim 1, wherein the focus adjustment comprises transitioning a focused region of the display to an element location of an element based on a salience value associated with the element.

3. The system of claim 1, wherein the focus adjustment comprises, in a following order:
    providing a focused region aligned with and based on the user gaze direction by directing a defocusing of other areas;
    transitioning the focused region to align with, over time, an element location of an element based on a salience value of the element;
    maintaining the alignment with the element location for a dwell time period;
    expanding an aperture size of the focused region over time; and
    removing the defocusing of the other areas.

4. The system of claim 3, wherein the controller is further configured to:
    expand the aperture size of the focused region.

5. The system of claim 1, wherein the display comprises an augmented reality display.

6. The system of claim 1, wherein the controller is further configured to receive overlay information via an overlay module, and wherein the salience values associated with the elements are further based on the overlay information.

7. The system of claim 6, wherein the overlay information comprises vehicle guidance information of a vehicle element.

8. The system of claim 7, wherein the vehicle guidance information comprises altitude and speed.

9. The system of claim 1, wherein the element assessor module is configured to generate element risk values corresponding to the elements and which are based on the element identities,
    and wherein the salience values associated with the elements are further based on the element risk values.

10. The system of claim 1, wherein the direction of the focus adjustment is further based on the salience value breaching a salience threshold.

11. The system of claim 1, wherein the controller is further configured to monitor and sort, via the monitor module, a list of the elements based on the salience values of the elements.

12. The system of claim 1, wherein the salience values of particular elements are configured to be based on a look-away time period that the user gaze direction is non-proximate to the particular elements.

13. A method comprising:
    receiving, via an environment imaging sensor, environment images comprising elements of an environment external to a display;
    identifying, via an environment module and based on the environment images, the elements and element identities and element locations associated with at least a portion of the elements;
    receiving, via a user state sensor, user images comprising a user gaze;
    tracking, via a user state module, a user gaze direction based on the user images;
    determining, via at least one of an element assessor module or a monitor module, salience values associated with the elements based on:
        the element identities; and
        an element awareness value based on the user gaze direction relative to the element locations; and
    direct a focus adjustment of a region of the display based on the salience values.

14. The method of claim 13, wherein the focus adjustment comprises transitioning a focused region of the display to an element location of an element based on a salience value associated with the element.

15. The method of claim 13, wherein the focus adjustment comprises, in a following order:
    providing a focused region aligned with and based on the user gaze direction by directing a defocusing of other areas;
    transitioning the focused region to align with, over time, an element location of an element based on a salience value of the element;
    maintaining the alignment with the element location for a dwell time period;
    expanding an aperture size of the focused region over time; and
    removing the defocusing of the other areas.

16. The method of claim 15 further comprising expanding the aperture size of the focused region.

17. The method of claim 13, wherein the display comprises an augmented reality display.

18. The method of claim 13 further comprising receiving overlay information, wherein the salience values associated with the elements are further based on the overlay information.

19. The method of claim 18, wherein the overlay information comprises vehicle guidance information of a vehicle element.

20. The method of claim 19, wherein the vehicle guidance information comprises altitude and speed.

* * * * *